Figure 1:
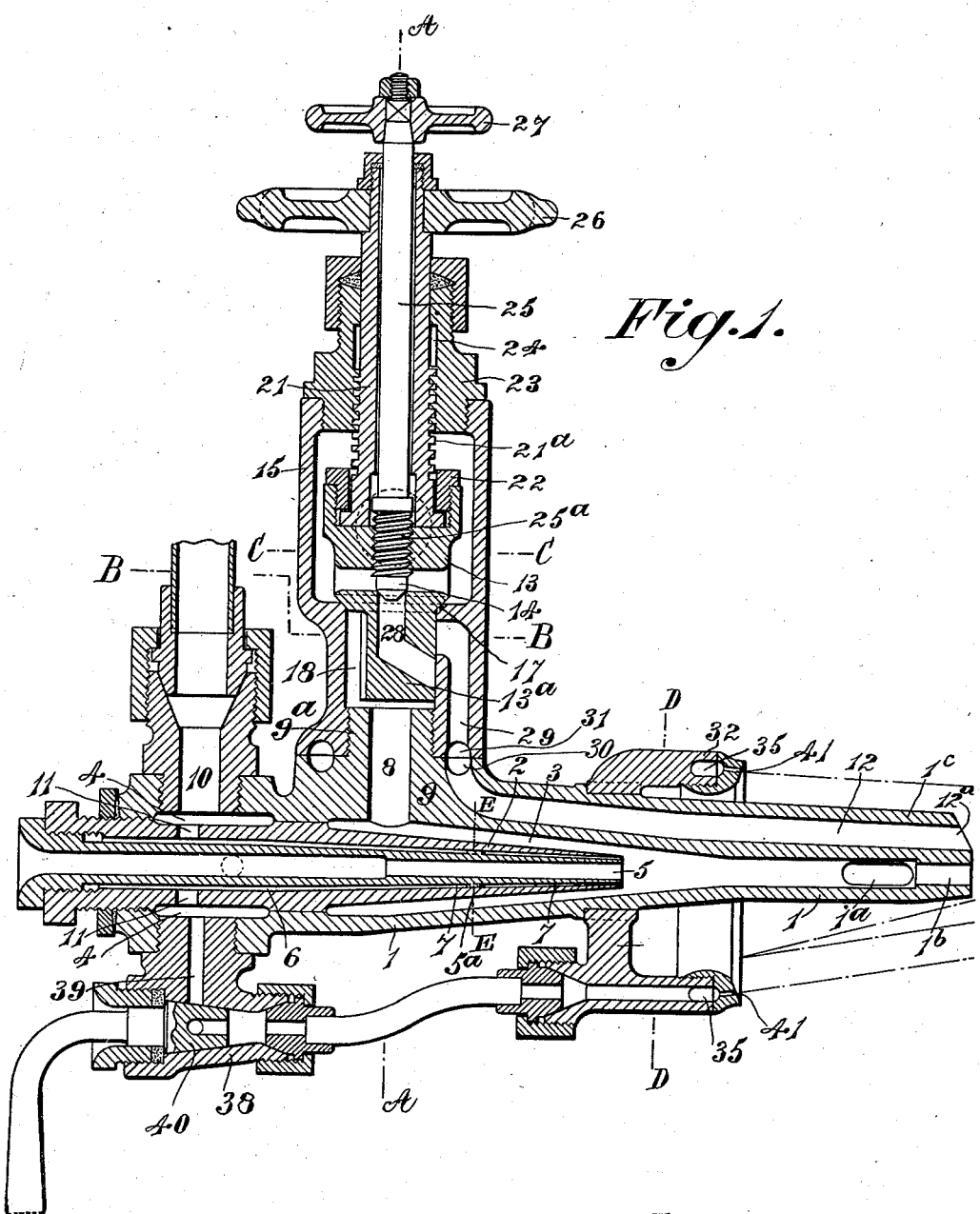

No. 719,801. PATENTED FEB. 3, 1903.
J. HOLDEN.
INJECTOR OR APPARATUS FOR BURNING LIQUID FUEL.
APPLICATION FILED SEPT. 20, 1901.
NO MODEL. 3 SHEETS—SHEET 1.

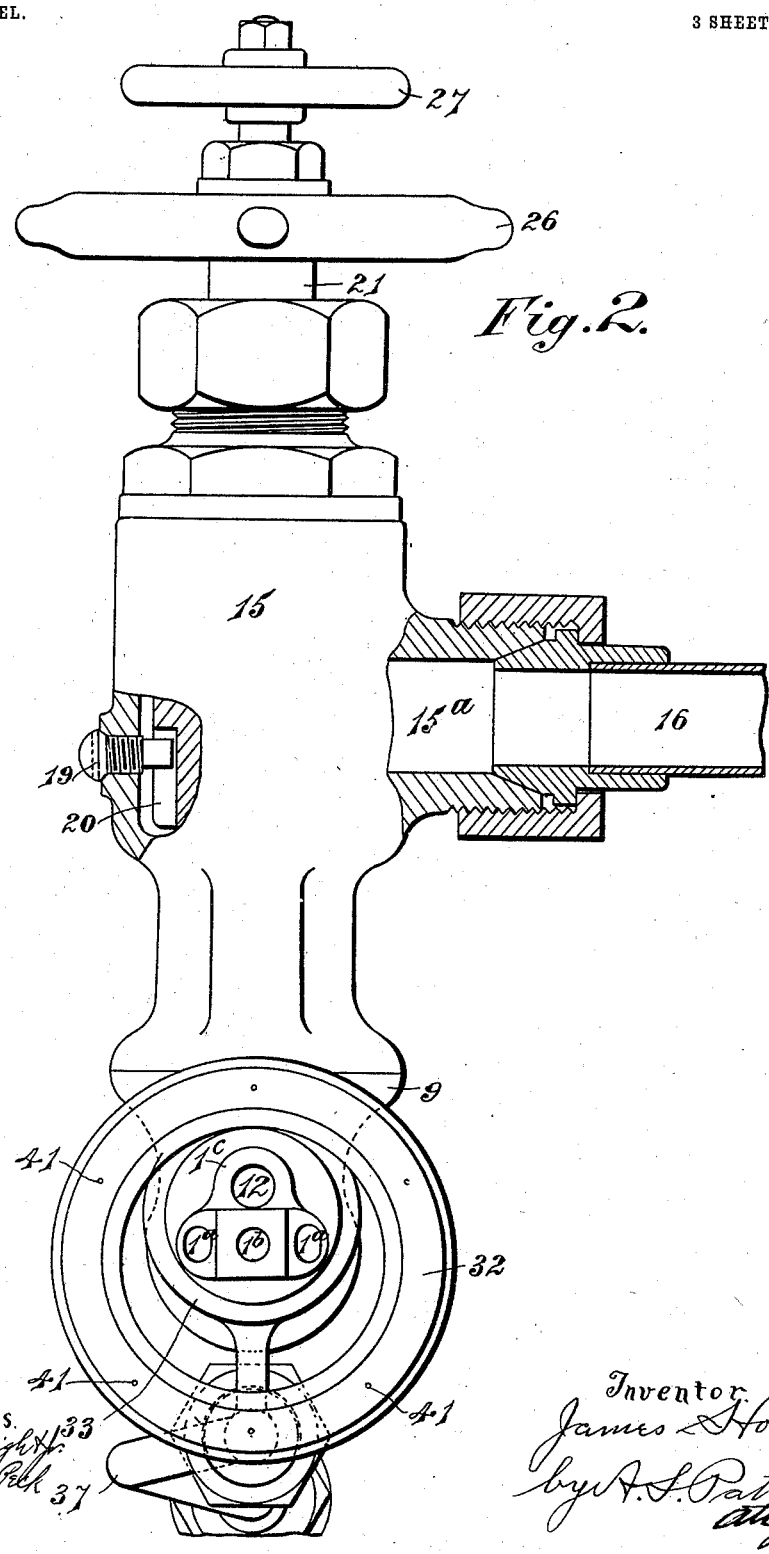

No. 719,801. PATENTED FEB. 3, 1903.
J. HOLDEN.
INJECTOR OR APPARATUS FOR BURNING LIQUID FUEL.
APPLICATION FILED SEPT. 20, 1901.
NO MODEL. 3 SHEETS—SHEET 3.
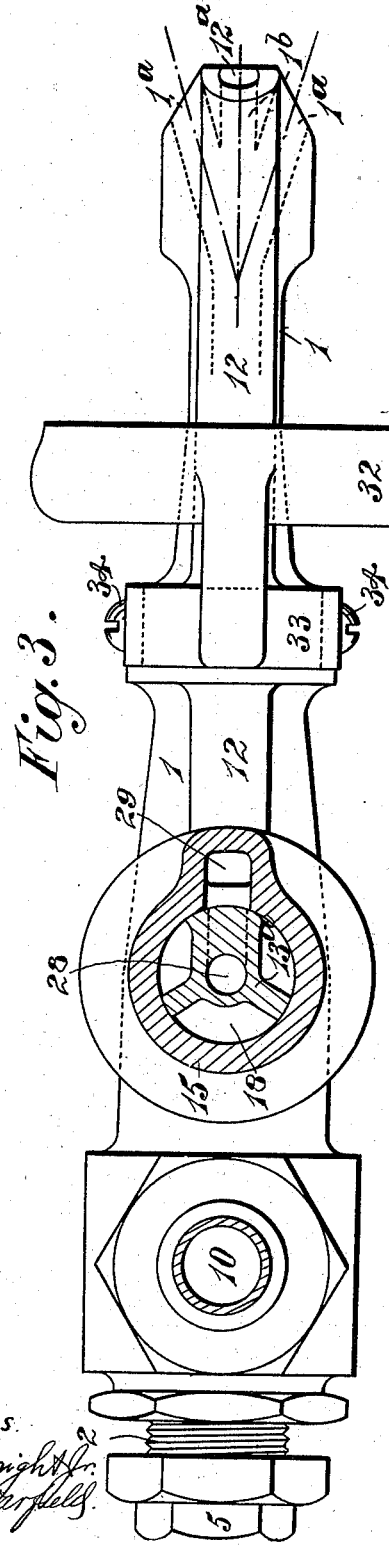
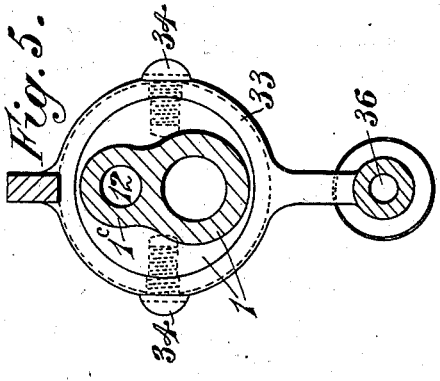
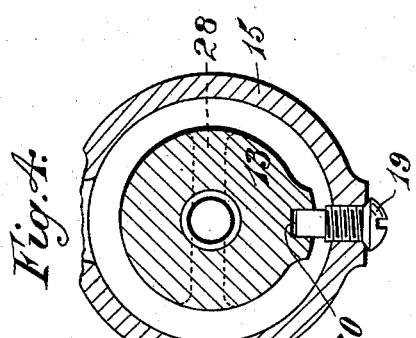
Witnesses
Inventor
James Holden
by A. S. Pattison
atty

UNITED STATES PATENT OFFICE.

JAMES HOLDEN, OF WANSTEAD, ENGLAND.

INJECTOR OR APPARATUS FOR BURNING LIQUID FUEL.

SPECIFICATION forming part of Letters Patent No. 719,801, dated February 3, 1903.

Application filed September 20, 1901. Serial No. 75,936. (No model.)

*To all whom it may concern:*

Be it known that I, JAMES HOLDEN, a subject of the King of Great Britain and Ireland, residing at Wanstead, in the county of Essex, England, have invented Improvements in Injectors or Apparatus for Burning Liquid Fuel, of which the following is a specification.

This invention has reference to improvements in compound liquid-fuel injectors of the kind constructed with two or more liquid-fuel-supply ports or passages the outlet ends of which are arranged to deliver liquid fuel at different points along the injector, so that the mixture of liquid fuel and steam produced by a jet of steam passing the first or main liquid-fuel outlet and becoming mixed with the liquid fuel flowing out of said outlet will after passing such outlet be caused to come in contact with and spray the liquid fuel flowing through the other or supplementary liquid-fuel outlet or outlets, the object being to spray a large quantity of liquid fuel by the use of a comparatively small amount of steam.

The present invention has for an object to enable the supply of liquid fuel to the main and supplementary liquid-fuel outlets of an injector of the kind mentioned to be controlled independently of one another, so that liquid fuel can when desired be supplied to the main liquid-fuel outlet and the rate of supply varied without necessarily supplying liquid fuel to the supplementary liquid-fuel outlet and so that the supply of liquid fuel to the latter outlet can be varied independently of that being supplied to the main liquid-outlet or can be completely cut off from the said supplementary outlet, so as to thereby enable the total quantity of liquid fuel being used at any time to be varied to suit varying requirements.

The invention also has for an object to so construct the liquid-fuel injector that it can be readily adapted for use as a right-handed injector or as a left-handed injector to suit requirement.

The invention also has for an object to improve the working and increase the efficiency of liquid-fuel injectors of the kind referred to and to render them more durable than heretofore usual.

For these and other objects the invention consists in certain novel features of construction and in combinations or arrangements of parts, all as hereinafter fully described, and more particularly pointed out in the claims.

In the accompanying illustrative drawings, Figure 1 shows in central vertical section a compound liquid-fuel injector constructed according to the present invention. Fig. 2 shows the said injector partly in front elevation and partly in cross-section on the line A A of Fig. 1. Fig. 3 shows the injector in sectional plan, the section being taken on the line B B of Fig. 1. Fig. 4 is a horizontal section on the line C C of Fig. 1. Fig. 5 is a cross-section on the line D D of Fig. 1. Fig. 6 is a cross-section of the central air-supply tube of the injector, the section being taken on the line E E of Fig. 1. Fig. 1 is drawn to a smaller scale than the other figures.

1 is the outer or main conical nozzle or casing of the injector, the forward end of which may, as shown, be formed with one or more lateral exit-ports 1$^a$ (two are shown) in addition to the central or axial exit-port 1$^b$.

2 is an inner conical nozzle screwed into the rear end of the nozzle or casing 1 and adapted to form with such nozzle or casing an annular conical liquid-fuel passage 3 around its forward portion and an annular steam-passage 4 around its rearward portion.

5 is a central tube screwed into the rear end of the nozzle 2 and adapted to form therewith a rear hollow cylindrical steam-space 6 and a forward conical steam-passage 7, having a narrow annular outlet. The central tube 5 is open at both ends, as usual, so that it will serve for the admission of air to the center of the injector and for the insertion when necessary of a cleaning-tool. The forward end of this central tube is preferably arranged to terminate, as shown, flush with the forward end of the inner conical nozzle 2 and is provided with ribs 5$^a$, Figs. 1 and 6, by which it is held centrally within such nozzle.

8 is the main liquid-fuel-inlet passage formed in an upwardly-extending branch or extension 9 of the nozzle or casing 1, the said inlet-passage being in communication at its inner end with the conical liquid-fuel passage 3.

10 is the inlet for the steam to be used in spraying the liquid fuel supplied to the injector, such inlet being in communication with the annular space 4, which communicates through holes 11 in the rear end of the nozzle 2 with the cylindrical steam-space 6 and conical steam-passage 7.

12 is a supplementary liquid-fuel-supply passage formed, as by casting, in an upper extension 1ᶜ of the forward end of the outer nozzle or casing 1 and having its outlet end 12ᵃ terminating directly about the central outlet 1ᵇ of the main nozzle 1. By forming the supplementary liquid-fuel passage 12 in metal, forming an extension of and integral with the metal—for example, cast-iron or bronze—of which the main nozzle or casing 1 is made, the difficulty heretofore experienced when a separate thin metal supplementary liquid-fuel-supply pipe is used—viz., the rapid burning away of the front end of such tube—is to a very large extent prevented, owing to the heat being rapidly conducted away from the front end of the wall of such supplementary passage to the whole body of the injector and dissipated.

The supply of liquid fuel to the main and supplementary liquid-fuel passages 8 and 12 is controlled by separate valves 13 and 14, respectively, located within a valve-box 15, that is screwed onto a central extension 9ᵃ of the branch 9 and is formed with a lateral liquid-fuel-inlet branch 15ᵃ, adapted to be connected to a liquid-fuel-supply pipe 16. The main valve 13 is formed with a conical face adapted to bear against an annular seat 17 in the valve-box 15 and to close or control a vertical passage 18, that is formed in the valve-box and communicates with the main liquid-fuel-supply passage 8. The main valve is prevented from turning by a screw 19, fixed in the wall of the valve-box and extending in a corresponding vertical groove 20 in the valve, and is raised and lowered by a rotary valve-spindle 21, the lower end of which is held in the top of the said valve by a screw-ring 22 in such a way that it is free to turn therein. The said valve-spindle is screw-threaded at 21ᵃ and works in a correspondingly-screw-threaded hole in a removable cap or cover 23, that is fixed to the top of the valve-box 15 and is provided with a stuffing-box 24, through which the upper part of the valve-spindle extends. The supplementary valve 14 is carried by the lower end of a rotary spindle 25, that is screw-threaded at 25ᵃ and works in a corresponding screw-threaded hole in the body of the main valve 13, the remaining portion of the said spindle extending upward through the top of the main-valve spindle 21.

26 and 27 are hand-wheels fixed to the upper ends of the valve-spindles 21 and 25, respectively.

The supplementary valve 14 controls a passage 28, that is formed in the main valve 13 and extends downward through an extension 13ᵃ thereof, the said passage terminating at one side of the extension in proximity to the upper end of a vertical passage 29, that is formed in the valve-box 13 and is in constant communication with the supplementary liquid-fuel passage 12. The valve extension 13ᵃ is arranged to slide against that side of the valve-box in which the passage 29 is formed, and the lower end of the passage 28 and the upper end of the passage 29 are so relatively arranged that when the main valve 13 is closed against its seat 17 the upper end of the said passage 29 will be closed. With the arrangement described the main valve 13 can by rotating the outer spindle 21 be opened to any desired extent to admit the required amount of liquid fuel to the main inlet-passage 8 without admitting liquid fuel to the supplementary passage 12, and the supplementary valve 14 can afterward be opened and closed to any desired extent to admit the required amount of liquid fuel to the supplementary passage 12 through the passages 28 and 29; but liquid fuel cannot be admitted to the supplementary passage 12 while the main valve 13 and passage 8 are closed, owing to the extension 13ᵃ then occupying the position shown in Fig. 1, in which the passages 28 and 29 are disconnected from each other.

To insure that the passage 29 shall be placed in communication with the supplementary passage 12 in whatever position the said passage 29 may come when the valve-box 15 is screwed to the extension 9ᵃ of the branch 9, and whether the valve-box be designed for use with a right-handed injector or with a left-handed one, the adjacent surfaces of the branch 9 and valve-box 15 are respectively formed with annular grooves 30 and 31 of concave section that are in connection with the supplementary passage 12 and the passage 29, respectively, the arrangement being such that when the valve-box is screwed in place the two grooves will form an annular passage located between and connecting the two passages 12 and 29.

32 is a steam-ring made in two parts that are screwed together and fixed eccentrically to and around both the nozzle 1 and supplementary passage 12 by means of a boss 33 and set-screws 34. The annular steam-passage 35 is connected by a passage 36 in an extension of the ring and a bent pipe 37 to the interior of a valve-case 38, that can be placed in communication with the steam-space 4 around the nozzle 2 through a passage 39, controlled by a hand-operated plug 40, the arrangement being such that by suitably operating the said plug steam can be admitted to the passage 35 in the ring, from which it will issue through small orifices 41 in the direction indicated by the dotted lines in Fig. 1, most of the air induced to flow through the said steam-ring by the issuing jets of steam passing between the lower portion of the ring and nozzle and being caused to rise through and become intimately mixed with the sprayed fuel proceeding from the main nozzle 1.

By the construction described the supply of liquid fuel to the injector can be readily controlled to suit varying requirements and large quantities of such fuel can be sprayed in a very effective and advantageous manner by the use of a comparatively small quantity of steam as the spraying medium.

What I claim is—

1. In a liquid-fuel injector, the combination with the outer nozzle or casing having main and supplementary liquid-fuel-supply passages, of separate main and supplementary valves to control said passages and effectively operable the one independently of the other when the main valve is open, said valves being carried the one by the other.

2. In a liquid-fuel injector, the combination with the outer nozzle or casing having main and supplementary liquid-fuel-supply passages, of separate main and supplementary valves to control said passages and effectively operable the one independently of the other when the main valve is open, said valves being arranged the one above the other and opening said passages in the order mentioned.

3. In a liquid-fuel injector having main and supplementary liquid-fuel-supply passages, the combination of an outer nozzle or casing, a valve-box secured thereto having an inlet for liquid fuel and adapted to be placed in communication with said passages, separate main and supplementary valves for independently controlling said passages arranged within said valve-box and carried the one by the other and effectively operable the one independently of the other when the main valve is open.

4. In a liquid-fuel injector, the combination with the outer nozzle or casing having main and supplementary liquid-fuel-supply passages, of a valve-box secured to said nozzle or casing and formed with separate main and supplementary passages in communication with the passages in the nozzle or casing, a main valve controlling the main passage in said valve-box and provided with an extension that is formed with a supplementary liquid-fuel-supply passage extending therethrough and is adapted to close the supplementary liquid-fuel-supply passage when the main valve is closed, a supplementary valve carried by said main valve and adapted, when said main valve is open, to independently control the main passage therein, and means for operating said valves the one independently of the other.

5. In a liquid-fuel injector, the combination with the outer nozzle or casing having main and supplementary liquid-fuel-supply passages, of a valve-box secured to said nozzle or casing and formed with separate main and supplementary passages in communication with the main passages in the nozzle or casing and separate main and supplementary valves carried the one by the other for controlling said passages, the adjacent surfaces of said nozzle or casing and valve having formed in and between them an annular passage that is in communication with both of the supplementary passages.

Signed at 77 Cornhill, London, England, this 9th day of September, 1901.

JAMES HOLDEN.

Witnesses:
PERCY E. MATTOCKS,
EDMUND S. SNEWIN.